United States Patent [19]

Makosch et al.

[11] 4,298,283

[45] Nov. 3, 1981

[54] INTERFEROMETRIC MEASURING METHOD

[75] Inventors: Geunter Makosch; Bernhard Solf, both of Sindelfingen, Fed. Rep. of Germany

[73] Assignee: International Business Machines Corporation, Armonk, N.Y.

[21] Appl. No.: 93,642

[22] Filed: Nov. 13, 1979

[30] Foreign Application Priority Data

Nov. 30, 1978 [DE] Fed. Rep. of Germany ....... 2851750

[51] Int. Cl.³ .................................................. G01B 9/02
[52] U.S. Cl. ..................................... 356/351; 356/349
[58] Field of Search .................... 356/349, 351, 359

[56] References Cited

U.S. PATENT DOCUMENTS

| | | | |
|---|---|---|---|
| 3,635,552 | 1/1972 | de Lang | 356/351 |
| 3,849,001 | 11/1974 | Inoue et al. | 356/351 X |
| 3,849,003 | 11/1974 | Velzel | 356/351 |
| 4,188,122 | 2/1980 | Massie et al. | 356/351 X |

*Primary Examiner*—John K. Corbin
*Assistant Examiner*—Matthew W. Koren

[57] ABSTRACT

Two radiation components differing from each other with regard to their state of polarization or their wavelength are directed onto closely adjacent points of the object to be measured. The reflected components are recombined and are fed to a polarization- or wavelength-dependent phase shifter periodically shifting the phase positions of the two components by $\lambda/2$ against each other. A phase shift of one of the components caused by the object to be measured is fully compensated for by periodically shifting the phase position of the other component at particular points in time, which can be determined, for example, by means of a connected analyzer and a photodetector. The values of the control voltage effecting the periodical phase shift in the phase shifter are measured at those points in time at which the phase difference between the two components equals zero. These values are proportional to the difference in height between the points of incidence of the two radiation components on the object surface or the slope of the object surface.

17 Claims, 7 Drawing Figures

INTERFEROMETRIC MEASURING METHOD

FIELD OF THE INVENTION

The invention relates to an interferometric measuring method using beams of different wavelengths and/or two beams polarized in different directions, which is particularly suitable for profile measurements, roughness measurements, planeness measurements, and measurements of the radius of curvature, as well as to an arrangement for implementing this method.

DESCRIPTION OF THE PRIOR ART

In practically all fields of technology and the exact sciences, the requirements for processing accuracies to be observed during the manufacture of the parts employed have been tightened considerably, a tendency which, as far as can be judged at this stage, is likely to continue at an increasing pace in the future. This holds, in particular, for the manufacture of integrated semiconductor circuits in the submicron range and for the manufacture of magnetic disks, for example, since the extreme miniaturization and the increased packaging densities necessitate extremely plane and flawless surfaces.

In order to meet these tightened requirements which are likely to be tightened even further in the future, extremely accurate, high-speed and, if possible, automatic measurements are required for the control of the original or starting materials and the monitoring of production processes, as well as for final testing, which at present cannot be carried out by means of the previously known methods and arrangements.

Thus, the resolution of the previously known interference or moire methods for simultaneously handling layer surface areas is too small for a number of applications, while the known high-resolution interference methods of determining the distance of a point-shaped surface area from a reference plane are too complicated and time-consuming when used for manufacturing control purposes. Apart from the fact that all known interference or moire methods are relatively slow and highly susceptible to faults, they are also generally poorly suited for automation, thus they can be employed for measuring urfaces subject to rapidly changing, dynamic influences in but a few cases. In the DE-PS No. 26 36 498 a method for interferometric surface measurements with grazing incidence is described, which permits relatively large surface areas to be simultaneously handled. Apart from the relatively poor resolution—the measuring accuracy being of the order of the wavelength of the light employed—, the sign of the slopes or the unevenness detected cannot be determined without additional means. For determining the exact magnitude of a slope or even the radius of curvature of a recess, the interference fringes have to be counted and the individual line spacings to be measured, which can hardly be done automatically. Subsequently, the values determined have to be evaluated by calculation in a rather complicated manner. In the DE-PS 26 36 211 an interferometric method with an increased resolution is described, whereby the radiation has to be directed at a particular angle and through a partially reflecting transmission grid onto the object to be measured. Apart from the complexity of the arrangements required and the relatively small field of vision, the signs of the slopes or the unevenness detected can only be determined with the aid of additional means. Thus, similar to the first citation, substantial means are required for accurately determining the size of the slopes detected or the radii of curvature. Other known methods of increasing the resolution of interferometric measurements, such as multicolour methods or comparator processes, are complicated, time-consuming, and, as a rule, permit covering only very limited fields of vision.

Other known methods for point-by-point layer thickness measurements, such as the ellipsometric method described in the OS No. 26 16 141, used polarized radiation incident on the measuring surface at a large angle, and the ellipticity of which is measured after reflection at the measuring surface. Evaluation is effected by a $\lambda/4$ plate arranged in the path of the reflected radiation, which is followed by a rotating analyzer, and a light detector following said analyzer in the direction of propagation of the radiation, and the output signals of which together with the output signals of an angle encoder connected to the $\lambda/4$ plate and/or the analyzer are fed to a computer for the determination of the Fourier coefficients. Apart from the complicated and space-consuming design of the arrangements required, which is attributable, above all, to the almost grazing incidence of the measuring beam, the measurements are time-consuming because of the rotating elements and the subsequent complicated calculations, so that it is not possible to examine a great number of measuring points on one or several scanning tracks, as is necessary, for example, for manufacturing control or final testing during the manufacture of miniaturized semiconductor circuits or magnetic storage disks. As a result of the almost grazing incidence, this method does not permit an arbitrary reduction (say 0.5 to 10 $\mu$m) of the diameter of the measuring points to be examined, which is indispensible for accurate planeness and roughness measurements required in a number of applications. Owing to the inevitable wear and thus the frequent repairs and adjustments to which the elements moved with great precision and at high speed are subject, as well as owing to their inevitable susceptibility to contamination and vibrations, arrangements of the above mentioned kind are not suitable for mass production applications, even when all conceivable precautions are taken to keep them in operation continuously.

SUMMARY OF THE INVENTION

It is the object of this invention to avoid the above mentioned disadvantages and to provide an interferometric method which, at a resolution in the Angstrom range and measuring times in the $\mu$s range, can be implemented by means of relatively simple and economic arrangements. In addition, the method, which is suitable for complete automation, is to supply the various values required, such as sign and size of the slopes, sign and magnitude of the unevenness detected, as well as radii of curvature, using only few technical means. This problem is solved by the invention described in the characterization of claim 1. In addition, the upper limit of the vertical measuring range, which in the case of conventional interferometric methods equals about half a wavelength, can be increased to about a fiftyfold of that value.

In comparison with the previously known measuring methods and measuring arrangements, which in the case of large-surface measuring areas have only relatively small resolutions, and which at high resolutions, because of the small-surface measuring areas and the long measuring times required, are not suitable for examining larger surface areas, the present invention has the advantage that it permits the examination of smallest areas with diameters of the order of 0.5 to 10 μm at a resolution in the Angstrom range and at a measuring speed of a few μs for each measuring point, so that large-surface areas can be examined by raster scanning within the shortest time. In addition, the design of the arrangement in accordance with the invention is considerably simpler than the designs of the various previously known arrangements with approximately comparable performances. Because of the simple design, the small dimensions, and the reduced susceptibility to faults, as well as the absence of moving parts and the high degree of unsusceptibility to vibrations, dust, and heat resulting therefrom, the arrangement in accordance with the invention is particularly suitable for monitoring manufacturing processes of various kinds. As a result of the simple design and the fact that the measuring beams are vertically incident on the surface to be examined, the method in accordance with the invention can be used without any difficulty for examining and measuring surfaces arranged at relatively large distances from the measuring arrangement, say 10 to 100 cm. Therefore, it is also possible to examine processes taking place in a transparent receptable or in a receptacle provided with a transparent window. Thus, the method in accordance with the invention is excellently suited for examining and monitoring processes carried out at high and maximum temperatures and even processes proceeding in a protective gas atmosphere. A further advantage of the invention over comparable arrangements is that the size of the measuring points and the resolution can be easily, where necessary, automatically varied over a wide range. As the method in accordance with the invention is based on the statistical evaluation of a great number of zero balances for each measuring point, the highly detrimental changes of the light source intensity, encountered with practically all automatic high resolution interferometric measuring methods or local reflectivity changes of the surface to be examined, are practically without any influence whatsoever.

As, in accordance with the invention, the measuring beams are split with the aid of polarizing optical and/or dichroic means, so that two interference patterns can be simultaneously generated and evaluated by means of two wavelengths, the invention has the further essential advantage that by applying known two-colour interferometry techniques, which are complicated and time-consuming to evaluate with the aid of conventional means, the upper limit of the measuring range, which for known interferometric methods equals have a wavelength of the radiation used, can be extended up to a fiftyfold or an even higher rate over the previously indicated value.

The foregoing and other objects, features, and advantages of the invention will be apparent from the following more particular description of preferred embodiments of the invention as illustrated in the accompanying drawings.

BRIEF DESCRIPTION OF THE DRAWINGS

The invention is described in detail below by means of the accompanying drawings.

DESCRIPTION OF THE PREFERRED EMBODIMENTS

Figure 1:
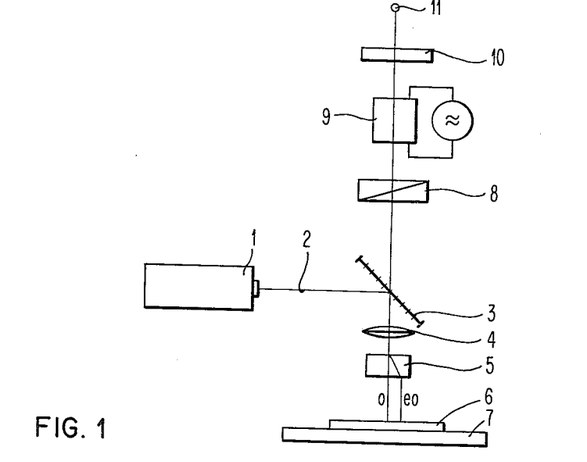
FIGS. 1 to 3 are schematic representations of three embodiments of the invention.

The arrangement shown in FIG. 1 consists of a light source 1 designed, for example, a laser, designed to generate a linearly polarized beam 2 which by a beam splitter 3, a lens 4, and a birefringent crystal 5 is directed onto the surface of a semiconductor wafer 6. The radiation reflected at the surface of the semiconductor wafer to be examined is retransmitted through the birefringent crystal 5, the lens 4, the beam splitter 3, a Soleil Babinet compensator 8, a polarization—dependent phase shifter 9, and an analyzer 10, whence it reaches a light detector 11.

The light emanating from the light source 1 is linearly polarized at an angle of 45° to the plane of the drawing and is split in the birefringent crystal 5 into two beams o and eo extending parallel and polarized perpendicularly to each other. After reflection at the surface of the semiconductor wafer 6 to be examined, the two beams are recombined in the birefringent crystal to form a single beam which, if an unevenness or a slope is present in the examined surface area of the semiconductor wafer 6, consists of two components with different phase positions. Assuming the reflectivities in the examined surface area are uniform, the intensities of these two components are equal, if the direction of polarization of the beam 2 deflected downwards at the beam splitter 3 includes an angle of 45° with the main axis of the birefringent crystal 5 consisting, for example, of calcite. By means of the Soleil Babinet compensator 8, the phase position of the two components can be shifted relative to each other, in order to set the phase difference of zero at the beginning of a series of measurements. The phase shifter 9 is designed and aligned in such a manner that the beam passing through it, is generally split into two components polarized perpendicularly to each other and which after leaving the unenergized phase shifter 9, are recombined in the form of a linearly polarized beam. If the phase shifter is controlled by a λ/2 AC voltage, the phase positions of the two components linearly polarized perpendicularly to each other are delayed by different amounts, so that the beam leaving the phase shifter is periodically and continuously converted at the period of the energizing alternating voltage from a beam linearly polarized in a particular direction into an elliptically polarized and subsequently into a beam linearly polarized perpendicularly to the first direction. As a result, the intensity of the beam leaving the analyzer 10 has a sinusoidal course having the sum frequency, and, in the case of a particular orientation of the analyzer 10, the same phase position as the alternating voltage energizing the phase shifter 9.

Figure 4:
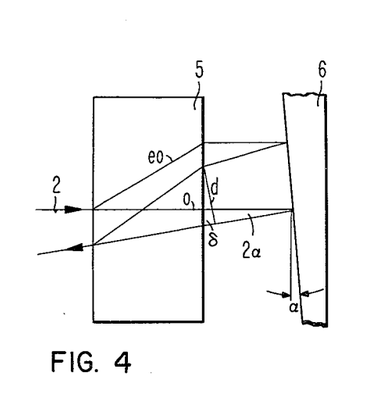
FIGS. 4 and 5 are schematic representations of the beam paths during the examination of a slope and a step, respectively.

If the surface, as shown, for example, in FIG. 4, has a slope $\alpha$, the ordinary and extraordinary beams, designated as o and eo, are deflected through an angle $2\alpha$ from the direction of incidence upon reflection at the object surface, so that the resulting phase difference may be expressed by the relation $$\phi_M = \frac{4\pi}{\lambda} d\alpha \qquad (1)$$

where λ is the wavelength of the radiation employed, α the inclination of the surface of the object 6, and d the distance between the beams o and eo.

Figure 5:
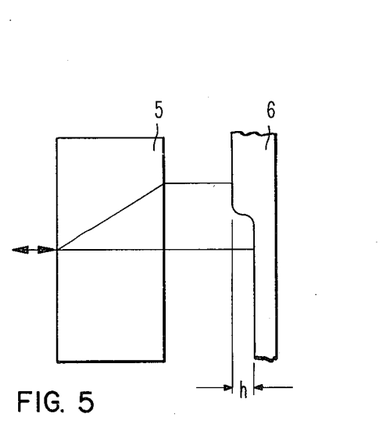

If the area on which the beams are incident has a step with a height h, as schematically represented in FIG. 5, a phase shift as defined by the relation $$\phi_M = \frac{4\pi}{\lambda} h \qquad (2)$$

occurs.

If there is a shift between the phase position of the ordinary and the extraordinary beam, the beam leaving the upper surface of the birefringent crystal 5 is no longer linearly but elliptically polarized, and if the phase shifter 9 is in the non-energized state, the beam impinges in the same state upon the analyzer 10, so that the same light intensity as is present with a linearly polarized beam no longer reaches the light detector 11. Upon energization of the phase shifter 9 by the λ/2 AC voltage, the phase positions of the two components corresponding to the ordinary and the extraordinary beam are periodically shifted relative to each other, so that the state in which the phase shift $\phi_M$ equals the phase shift $\phi_p$ in the phase shifter 9 is encountered at least once in each period.

If $\phi_M$ changes between the values $+\pi$ and $-\pi$, which leads to the linearly polarized radiation to be rotated from a first direction, via a plurality of elliptical intermediate states, to a second direction perpendicular to the first, and vice versa, then the relation $$\phi_G = \phi_P + \phi_M \qquad (3)$$

is applicable. In such a case the intensity of the beam leaving the analyzer 10 may be represented by the relation $$I = \tfrac{1}{2} Io (1 - \cos \cdot \phi_G) \qquad (4)$$

where Io is the maximum intensity leaving the analyzer.

Thus, a corresponding electrical signal will also occur at the output of the light detector 11.

From the two above mentioned relations the relation $$I = \tfrac{1}{2} I_0 (1 - \cos \cdot (\phi_P + \phi_M)) \qquad (5)$$

is obtained, where $I_O$ is the intensity reaching the light detector 11 if the direction of the polarizer and the direction of the linearly polarized radiation coincide, where $\phi_M$ is the measured phase difference and $\phi_P$ is the phase difference periodically generated in the phase shifter 9.

From the relation (5) there is readily obtained $$\phi_G = \phi_P + \phi_M = 2m\pi (m=0, \pm 1, \pm 2 \ldots) \qquad (6)$$

For the values $|\phi_M| < \pi$, the measuring values are clearly defined. Subject to the limitation that for $$|\phi_P + \phi_M| < 2\pi \qquad (7)$$

the number of zero positions is reduced to one, namely, $$\phi_P + \phi_M = 0 \qquad (8)$$

so that $$\phi_P = -\phi_M \qquad (9)$$

The phase difference $\phi_M$, caused by the object, can be determined on the basis of this relation by continuously changing the phase difference $\phi_P$ generated by the modulator until the intensity minimum of the radiation passing the analyzer 10 occurs. As the phase shift $\phi_P$ is a linear function of the voltage V applied to the phase shifter 9, the relation $$\phi_P = k V \qquad (10)$$

applies, where k is an eletro-optical constant and V the voltage energizing the phase shifter.

If the voltage applied to the phase shifter 9 is changed until $I = I_{min}$ occurs, $$\phi_M = -k V_m \qquad (11)$$

follows from (9) and (10), so that the voltage $V_m$, at which the intensity of the radiation passing the analyzer 10 and thus the voltage occuring at the output of the light detector 11 is at a minimum, is indicative of the phase difference $\phi_M$ to be measured, which is generated by the object. The signs + or − of the measured voltage $V_m$ indicate whether the slope or the step extends in a positive or a negative direction.

As a manual change of the voltage energizing the modulator 9 is complicated and could yield but inaccurate results, an automatic method in accordance with the invention is described, whereby the magnitude of the voltage energizing the modulator is periodically changed in accordance with the relation $$V = V_{\lambda/2} \cdot \cos \cdot \omega t \qquad (12)$$

where $V_{\lambda/2}$ is the half-wave voltage, ω is the modulation frequency, and t is the time.

From the above mentioned relation, a phase modulation in accordance with the relation $$\phi_M = k \cdot V_{\lambda/2} \cos \omega t = \pi \cos \omega t \qquad (13)$$

is obtained. Corresponding to the relations (11) and (13), the intensity measured by the light detector thus changes in accordance with the relation $$I/I_0 = \tfrac{1}{2} - \tfrac{1}{2} \cos \cdot (\pi \cdot \cos \cdot \omega t + \phi_M) \qquad (14)$$

Figure 6:
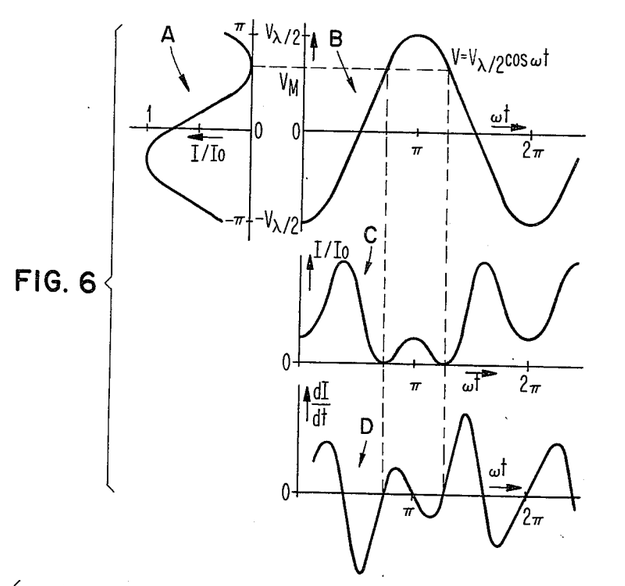
FIGS. 6 and 7 are curves serving to explain the method in accordance with the invention.

The curves shown in FIG. 6 apply to a phase difference of $\phi_M = -0.67\pi$.

The curve designated as (A) in this figure represents the intensity as a function of the phase difference $\phi_p$ in the range $-\pi < \phi_p < \pi$. The curve designated as (B) in FIG. 6 represents the voltage energizing the phase shifter 9, as a function of time. This curve is equivalent to the phase modulation curve. The curve designated as (c) in FIG. 6 is the intensity of the radiation measured by the light detector 11, and the curve designated as (D) is derived from the curve designated as C.

Figure 7:
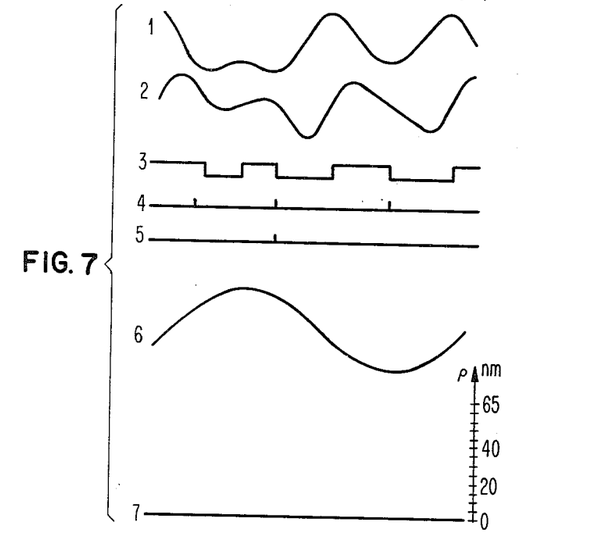

In FIG. 7 the method is explained, by means of which the signals obtained from the arrangement illustrated in FIG. 1 are converted into information on the values measured at the object. The curve in the first line of this figure represents the ratio of the respective voltage measured at the output of the light detector 11 to the maximum voltage occurring at that output. The curve in the second line represents the voltage occurring at the output of a conventional differentiating circuit 1 (not shown), to the input of which a voltage in accordance with the curve in line 1 is applied. The voltage occurring at the output of the differentiating circuit, which is represented by the curve in line 2, is fed to a conventional multivibrator (not shown), preferably designed as a Schmitt trigger, on whose output the rectangular voltage shown in line 3 appears. In a monostable multivibrator connected to the Schmitt trigger the negative edges of the rectangular voltage illustrated in the third line are converted into needle pulses (line 4), of which the center one of the three needle pulses corresponding to each period of the curve in line 1 is selected with the aid of a clock pulse derived from the $\lambda/2$ voltage generated by the source 9. This needle pulse coinciding in time with one of the two main minima of the curve in line 1 is fed together with a sine voltage (line 6), supplied by the voltage source 9, to a conventional sample and hold circuit (not shown) and is combined in such a manner that the value of the sine voltage (line 6) present upon the occurrence of the needle pulse is retained and stored until the next needle pulse occurs. Thus, the magnitude of the direct voltage represented in line 7 is a signal analogous to the respective unevennes or slope measured. The arrangement is such that the electrical analogue signals (line 7) present at the output of the processing circuit correspond in each case to the unevenness or slope existing in the examined surface area. The exact values of the slopes or the height of the unevenness determined can be read directly from a correspondingly calibrated electrical measuring device or from an oscilloscope screen. For the purpose of scanning uniformly curved surfaces, these devices can also be calibrated to suit the values of the radii of curvature.

As for most applications not only a practicular resolution but also the size of the respective measuring area covered by the measuring process is an optimum one, the invention provides for a greater number of birefringent crystals 5 with differing birefringent properties and/or thicknesses to be arranged along a straight line on a shiftable support or along a circular line on a rotatably mounted revolver, so that the distance between the ordinary beam o and the extraordinary beam eo can be changed, as necessary, in accordance with the requirements to be observed with regard to the resolution and the diameter of the area to be covered during measuring. For very rapid changes of the distance between the ordinary and the extraordinary beam it may be expedient to replace the birefringent crystal 5 by a known digital electro-optical light deflector, by means of which the distance between the two beams can be changed at almost the speed of light in a random number of steps.

As the diameter of a laser beam is limited only by the resolution of the focussing optical elements used, it is possible without any difficulty to effect the measurements using beams with diameters ranging from 0.5 $\mu$m to several mm. Correspondingly, the distances between the ordinary and the extraordinary beams can be changed between 0.5 $\mu$m and several cm. As beam diameters and distances between the ordinary and the extraordinary beams of several 100 $\mu$m do not require focussing optical elements, the distance between the birefringent crystal, the output of an electro-optical digital light deflector, and the object to be measured, respectively, may be of the order of 1 meter.

As an electro-optical modulator 9 energized at a frequency of several Mc/s permits a measuring process consisting of several individual measurements, the results of which can be statistically averaged by means of a simple circuit, to be effected in about 1 $\mu$s, the present invention is particularly suitable for planeness measurements of planes on parts moved at high speed, for example, on magnetic storage disks rotating at the usual operating speed of 3000 revolutions per minute. If several individual measurements are carried out for each measuring point and their results are statistically averaged, vibrations or other influences occurring during measuring can be largely eliminated. For this purpose, the whole disk surface, for example, can be measured in several seconds by continuously shifting the arrangement in accordance with the invention in the direction of the disk radius. For scanning semiconductor wafers at extremely high speeds during and after the individual production steps, it may be expedient for the birefringent crystal 5 to be preceeded by an electro-optical digital or analogue light deflector operated at a frequency of 1 Mc/s or to replace the birefringent crystal 5 by a light deflector deflecting a double beam.

Figure 2:
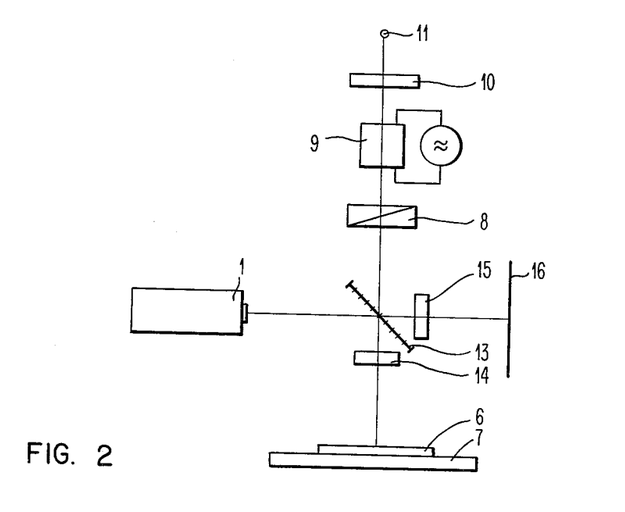

The embodiment of the invention illustrated in FIG. 2 comprises a Michelson interferometer operated in accordance with the inventive method. A linearly polarized light beam 2 emanating from a light source 1 designed, for example, as a laser, and the polarization plane of which together with the plane of the drawing includes an angle of 45°, is directed onto a polarizing beam splitter 13 directing the beam component, polarized in one direction, through a $\lambda/4$ plate 14 onto the upper surface of a semiconductor wafer 6 arranged on a support 7, while the linearly polarized component polarized perpendicularly to the direction of polarization of the first component of the beam 2 passes the beam splitter 13, impinging upon a reflecting reference surface 16 through a $\lambda/4$ plate 15. The directions of polarization of the components reflected at the semiconductor wafer 6 and the reflecting reference surface 16, respectively, are rotated through 90°, since they pass the plates 14 and 15, respectively, twice, so that the component reflected from the semiconductor wafer 6 passes the beam splitter 13, while the component emanating reflected the reflecting reference surface is deflectd at the beam splitter 13 in the direction of the arrangement consisting of the elements 8, 9, 10, and 11, whose identity and operation has been explained in detail in connection with the description of FIG. 1.

Figure 3:
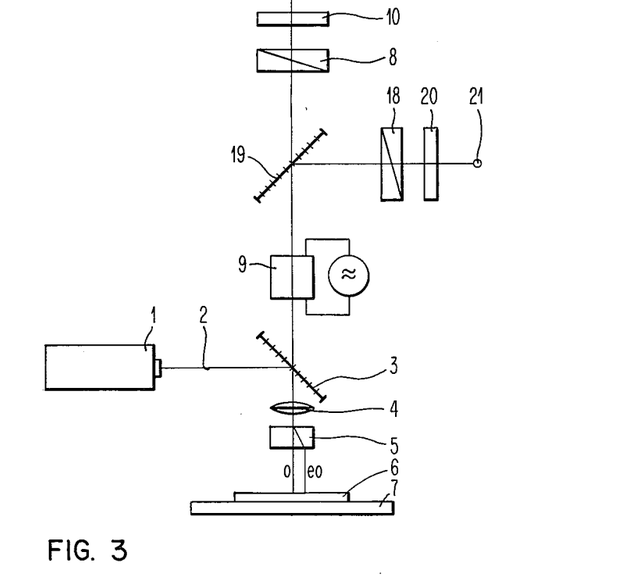

FIG. 3 shows an embodiment of the invention by means of which the measuring range of the method, in accordance with this invention can be extended to at least a fifty fold of the value previously mentioned. It is true that the arrangements illustrated in FIGS. 1 and 2 permit very accurate interferometric measurements in fractions of $\mu$s, but the upper limit of the measuring range, similar to all interferometric measuring methods, is practically half the wavelength of the radiation used. To increase the measuring range of the arrangements illustrated in FIGS. 1 and 2, known multicolour interferometry technique is employed, taking advantage of the fact that when the method in accordance with the invention is used, a beam may be split into two components not only by polarizing optical or dichroic elements but that these elements may be jointly and concurrently used in a single measuring arrangement. Thus, using a single arrangement, the method in accordance with the invention permits two measurements to be simultaneously performed at two different wavelengths, without any substantial additional means being required. By simply combining analogous measuring results which are simultaneously available in the form of voltages, the measuring range can be theoretically extended by powers of ten. Because of the high resolution of the two individual measurements carried out simultaneously, relatively high periodicities of the signal obtained by superposition of the two individual measuring values can be determined at a high degree of accuracy, so that the measuring range can be extended without any particular means from a lower limit of several nm to an upper limit of $+\mu m$. As the values yielded by the two individual measurements carried out simultaneously can be easily combined, the results of the measurements in the extended measuring range can be obtained in fractions of microseconds.

The beam 2, emanating from a light source 1 preferably a laser, which includes the wavelength $\lambda 1$ and $\lambda 2$, and which is linearly polarized at an angle of 45° to the plane of the drawing, is directed from beam splitter, through a lens 4 and a birefringent crystal 5 in which it is split into two beams o, eo polarized perpendicularly to each other, onto the top surface of a semiconductor wafer 6 arranged on a support 7. The ordinary and extraordinary components reflected at the semiconductor wafer are combined in the birefringent crystal to form a single beam, whose components corresponding to the ordinary and the extraordinary beam are in-phase if the object surface is plane and perpendicular to the measuring beams. Subsequently, the beams pass the lens 4, the beam splitter 3, and a polarization-dependent AC-controlled phase shifter 9, whence they are fed to a dichroic beam splitter 19 passing the radiation including the wavelength $\lambda 1$ through a Soleil Babinet compensator 8 and an analyzer 10 to a light detector 11. The radiation having the wavelength $\lambda 2$ is reflected to the right from a beam splitter 19, reaching a second light detector 21 through a second Soleil Babinet compensator 18 and a polarizer 20. The function of this arrangement may be seen from the description of FIG. 1. The difference between the two arrangements chiefly consists in that with the arrangement of FIG. 1 the beam leaving the phase shifter 9 is directly fed to an analyzer and a light detector, while in the case of the arrangement of FIG. 3 the beam leaving the phase shifter 9 is physically split into its two colour components by means of the dichroic beam splitter 19, the two colour components being fed to the light detectors 11 and 21, respectively, via one associated analyzer each. If polychroic elements are used, it is, of course, also possible to use radiations with more than two wavelengths.

When the function of the arrangement shown in FIG. 1 was discussed, it was found in accordance with the relation $$\phi_G = \phi_P + \phi_M = 2n\pi \ (n=0, \pm 1, \pm 2, \ldots) \tag{6}$$

that $\phi_M$ is clearly defined only when the interference order n is known. In practice, this can be assumed to be the case only with special applications. Generally, there is the limiting factor that differences in height can be measured only up to $\lambda/2$.

This does not apply to measurements carried out simultaneously or successively at two different light wavelengths $\lambda_1$ and $\lambda_2$. In accordance with the relations (1) and (6), the following holds for the two wavelengths $$\phi_{M1} = \frac{4\pi}{\lambda 1} ds = \phi_{G1} + 2n\pi \ (n = 0, 1, 2, 3 \ldots) \tag{15}$$

and $$\phi_{M2} = \frac{4\pi}{\lambda 2} ds = \phi_{G2} + 2m\pi \ (m = 0, 1, 2, 3 \ldots) \tag{16}$$

with the phase differences to be measured $$\begin{array}{l}\phi_{G1} < 2\pi \\ \phi_{G2} < 2\pi\end{array} \tag{17}$$

The relations (15) and (16) permit no clear definition of ds by means of the measuring values in accordance with (17) if the orders m and n are different and unknown. However, the unknown height ds can be clearly defined if the interference orders m and n are the same, i.e., $$m = n \tag{18}$$

follows from a combination of the relations (15), (16), and (18)

$$ds = \frac{\phi_{G1} - \phi_{G2}}{4\pi\left(\frac{1}{\lambda 1} - \frac{1}{\lambda 2}\right)} \tag{19}$$

where $\phi_{G1}$ is the phase difference measured at $\lambda 1$ and where $\phi_{G2}$ is the phase difference measured at $\lambda 2$, and $\lambda_{1,2}$ are the light wavelengths.

The relation (18) leads to a new definition of the measuring range.

From the relation (17)

$$\phi_{G1} - \phi_{G2} < 2\pi \tag{20}$$

is obtained, from which there follows for ds in accordance with (19) the limitation $$ds < \frac{2\pi}{4\pi} \cdot \left(\frac{1}{\lambda 1} - \frac{1}{\lambda 2}\right) \tag{21}$$

or $$ds < \frac{\lambda_1 \cdot \lambda_2}{2(\lambda_2 - \lambda_1)}$$

From this relation the measuring range ds is obtained which is subject to (18). In this measuring range the measurement using two wavelengths $\lambda 1$ and $\lambda 2$ yields a clear value ds which is a function of the interference order n. The size of this measuring range depends upon the choice of the wavelengths $\lambda 1$ and $\lambda 2$. It is obtained without difficulty from the relations (21).

Thus, a measuring range $ds = 30 \ \mu m$ applies, for example, to $\lambda 1 = 472.7$ nm $\lambda 2 = 476.5$ nm. This measuring range already meets the measuring requirements to be observed during the manufacture of semiconductors. The measurements can be carried out either successively or simultaneously by means of the arrangement shown in FIG. 3.

It is, of course, also possible to replace the electro-optical phase shifter illustrated in FIGS. 1, 2, and 3 by other suitable modulators, such as magneto-optical or piezo-optical phase shifters. The method and the arrangement in accordance with the invention are not only suitable for measuring slopes and unevenness but also for measuring layer thicknesses and diffraction indices.

While the invention has been particularly shown and described with reference to particular embodiments thereof, it will be understood by those skilled in the art that the foregoing and other changes in form and details may be made therein without departing from the spirit and scope of the invention.

What is claimed is:

1. A interferometric method for analyzing the planarity of a surface, comprising
   (a) generating two discrete coherent light beams each having at least one wavelength in common and polarized in different directions relative to each other,
   (b) reflecting said beams from spaced surface portions into corresponding return beams,
   (c) shifting the phase relation of the return beams to compensate for any phase shift resulting on reflection from said surface portions, and
   (d) detecting said compensation for each common wavelength constituent as a function of the variations in the planarity of said surface.

2. The method of claim 1 wherein one of said surface portions is a surface of a discrete reference plane.

3. An interferometric method for analyzing the planarity of a surface, comprising
   generating a coherent light beam having at least one wavelength constituent,
   splitting said beam into two spaced component beams polarized orthogonally to each other,
   directing said component beams onto said surface,
   recombining the surface reflected portions of said component beams into a sampled beam,
   cyclically shifting the phase relation of the component beams in said sampled beam to compensate for the phase shift induced by reflection from said surface,
   detecting for each common wavelength constituent the point in time at which said compensation takes place as a linear function of the reflected phase shift corresponding height variations at the points of incidence of said component beams on said surface.

4. An inferferometric method for analyzing the planarity of a surface, comprising
   generating a coherent light beam having at least one wavelength constituent, splitting said light beam into two spaced component beams polarized orthogonally to each other,
   directing at least one of said component beams onto said surface,
   recombining into a sampling beam the reflected portions of said one component beam from said surface with the other of said two component beams,
   cyclically shifting the phase relation of the component beams in said sampling beam to compensate for any phase shift induced by reflection from said surface, and
   detecting for each common wavelength constituent the point in time at which said compensation takes place as a function of the reflected phase shift corresponding to the point of incidence of said one component beam on said surface.

5. The method of claim 4 wherein the said other of said component beams is directed to a spaced portion on said surface with its reflected portions recombined into said sampling beam.

6. The method of claim 4 wherein said other of said component beams is redirected to a reference surface with its reflected portions recombined as a reference component beam in said sampling beam.

7. An interferometric system for analyzing the planarity of a surface, comprising
   means for generating two discrete coherent light beams having at least one wavelength in common and polarized in different directions relative to each other,
   means for directing said beams on spaced surface portions
   means for recombining portions of said beams, reflected from said surfaces into, corresponding return beams,
   means for shifting the phase relation of the return beams to compensate for any phase shift resulting on reflection from said surface portions, and
   means for detecting said compensation for each common wavelength as a function of the planarity of said surface.

8. The system of claim 7 wherein one of said surface portions comprise a surface of a discrete reference plane.

9. An interferometric system for analyzing the planarity of a surface, comprising
   means for generating a coherent light beam having at least one wavelength constituent,
   means for splitting said beam into two spaced component beams polarized orthogonally to each other,
   means for directing said component beams onto said surface at spaced portions thereof,
   means for recombining portions of said component beams, reflected from said surface, into a sampled beam,
   means for cyclically shifting the phase relation of the reflected component beams in said sampled beam to compensate for any phase shift induced by reflection from said surface,
and
   means for detecting for each common wavelength, the point in time at which said compensation takes place as a linear function of the reflected phase shift corresponding to height variations at the points of incidence of said component beams on said surface.

10. The system of claim 9 wherein said light splitting means, and means for directing component beams to said surfaces and recombining means comprise
   a birefringent crystal disposed in the paths of the incident beam and reflected component beams,
   said cyclically shifting means comprises a polarization dependent wave shifter, and
   said detecting means includes an analyzer and is coordinated with said wave shifter.

11. The system of claim 10 including a Soleil Babinet compensator, at the entry of said analyzer to zero the phase difference of said component at the beginning of a series of measurements.

12. An interferometric system for analyzing the planarity of a surface, comprising
   means for generating a coherent light beam having at least one wave length, means for (a) splitting said light beam into two spaced component beams polarized in different directions relative to each other (b) directing at least one of said component beams onto said surface and (c) recombining onto a sampled beam the reflected portions of said one component beam, from said surface, with the other of said two component beams, means for cyclically shifting the phase relation of the component beams in said sampled beam to compensate for any phase shift induced by reflection from said surface, and means for detecting for each said wavelength the point in time at which said compensation takes place as a function of the reflected phase shift corresponding to the point of incidence of said one component beam or said surface.

13. The system of claim 12 wherein said beam splitter, directing and recombining means comprises a birefringent crystal disposed in the paths of the incident and reflected beams, said cyclically shifting means comprises a polarization dependent wave shifter, and said detecting means includes an analyzer and is coordinated with said wave shifter.

14. The system of claim 13 including a Soleil Babinet compensator, at the entry of said analyzer to zero the phase difference of said component at the beginning of a series of measurements.

15. The system of claim 12 including means for directing the said other of said component beams to a spaced portion of said surface prior to recombination with the reflected one component beam.

16. The system of claim 15 wherein said beam splitter, directing and recombining means comprises a birefringent crystal disposed in the paths of the incident and reflected beams, said cyclically shifting means comprises a polarization dependent wave shifter, and said detecting means includes an analyzer and is coordinated with said wave shifter.

17. The system of claim 16 including a Soleil Babinet compensator, at the entry of said analyzer to zero the phase difference of said component at the beginning of a series of measurements.

* * * * *